United States Patent [19]

Alexandratos

[11] Patent Number: 4,664,700
[45] Date of Patent: May 12, 1987

[54] SELECTIVE EXTRACTION OF METAL IONS WITH POLYMERIC EXTRACTANTS BY ION EXCHANGE/REDOX

[75] Inventor: Spiro D. Alexandratos, Knoxville, Tenn.

[73] Assignee: University of Tennessee Research Corporation, Knoxville, Tenn.

[21] Appl. No.: 874,789

[22] Filed: Jun. 13, 1986

Related U.S. Application Data

[63] Continuation of Ser. No. 661,350, Oct. 16, 1984, abandoned, which is a continuation-in-part of Ser. No. 614,298, May 25, 1984, abandoned.

[51] Int. Cl.$^4$ .............................................. C22B 3/00
[52] U.S. Cl. ............................. 75/101 BE; 210/673; 210/688; 423/24; 423/63; 423/DIG. 14; 521/31
[58] Field of Search .................... 521/31; 75/101 BE; 423/21.5, 22, 24, DIG. 14; 210/673, 688

[56] References Cited

U.S. PATENT DOCUMENTS

| | | | |
|---|---|---|---|
| 2,764,562 | 9/1956 | Drake | 525/340 |
| 2,764,563 | 9/1956 | McMaster et al. | 260/2.2 |
| 2,911,378 | 11/1959 | Bregman | 521/31 |
| 3,220,989 | 11/1965 | Rolih et al. | 525/340 |
| 3,903,044 | 9/1975 | Wang | 525/340 |
| 3,914,126 | 11/1975 | Ralkshys, Jr. et al. | 521/31 |
| 3,943,074 | 3/1976 | Dulog | 521/31 |

OTHER PUBLICATIONS

"Synthesis of Diarylphosphine Oxides by the Friedel–Crafts Method," A. W. Frank, J. Org. Chem., 24, 966, (1959).

"Synthesis of Aromatic Phosphonic Acids and Their Derivatives," G. M. Kosolapoff et al., J. Am. Chem. Soc., 69, 2020 (1947).

"Actinide Extractants: Development, Comparison, and Future," R. R. Shoun et al., reprinted from ACS Symposium Series, No. 117 (1980).

"Synthesis of Phosphorus–Containing Wofatit Cation Exchangers and Their Affinity Toward Selected Cations", R. Bogoczek et al., J. Appl. Poly. Sci., 26, 4161 (1981).

Electron–Transfer Polymers (Oxidation–Reduction Polymers)", Harold G. Cassidy, Journal of Polymer Science–Part D (1972).

*Primary Examiner*—Joseph L. Schofer
*Assistant Examiner*—Bernard Lipman
*Attorney, Agent, or Firm*—Leudeka & Neely

[57] ABSTRACT

The specification discloses a method for the extraction of metal ions having a reduction potential of above about +0.3 from an aqueous solution. The method includes contacting the aqueous solution with a polymeric extractant having primary phosphinic acid groups, secondary phosphine oxide groups, or both phosphinic acid and phosphine oxide groups.

4 Claims, No Drawings

SELECTIVE EXTRACTION OF METAL IONS WITH POLYMERIC EXTRACTANTS BY ION EXCHANGE/REDOX

This application is a continuation of my application Ser. No. 06/661,350, filed Oct. 16, 1984, now abandoned, is a continuation-in-part of my application Ser. No. 06/614,298 filed May 25, 1984, abandoned, all of which have been assigned to the assignee of this invention.

The present invention relates to a method for the extraction of metal ions from an aqueous solution and more particularly relates to a method for the extraction of selected metal ions from an aqueous solution by ion exchange and by reduction of the metal ions to the elemental state.

Separation of metal ions from aqueous solutions is often required for pollution control or to recover valuable metals. Many liquid-liquid extraction systems have been employed for such purposes which typically employ an organic phase including one or more extractants dissolved in an organic solvent or a homogeneous liquid extractant. Extraction is performed by contacting the organic phase with the aqueous phase, i.e., the solution containing the metal ions. While liquid-liquid extractant systems are generally effective and have the capacity for the selective extraction of certain groups of metal ions, extensive equipment is needed for the handling of the organic phase and for separating the aqueous phase from the organic phase. Moreover, extractant loss occurs due to solubility into the aqueous phase and due to entrainment during phas separation. When the extraction is being performed for pollution control purposes, the beneficial effects of the extraction may be counteracted by the solubility or entrainment of the solvent or extractant in the aqueous phase.

In order to solve problems associated with liquid-liquid extractant systems, attempts have been made to develop solid-liquid extractant systems such as polymeric extractant systems. With polymeric extractant systems, the extraction is performed by contacting the solution with a polymeric extractant. For example, the solution may be passed through a column containing the polymeric extractant. A solvent or liquid extractant is not used and problems associated with solvent and/or extractant loss are clearly eliminated. Polymeric extractant systems are also easily adapted for continuous operation.

While some success has been achieved towards the development of methods for the extraction of metal ions using commercial ion exchange resins as the extractant, such methods are generally limited in utility due to low metal ion loading or by the lack of selectivity for specific metal ions, or both. Other methods employing specialized polymeric extractants have been developed which are more selective. However, due to the difficulty in synthesizing the extractants these methods are generally unsuitable for commercial purposes. Generally, none of the known methods for the extraction of metal ions remove the ions with the selectivity needed for the removal of certain toxic metal ions and for the recovery of valuable metals.

It is accordingly an object of the present invention to provide a method for the extraction of metal ions from aqueous solutions with a polymeric extractant. It is another object of the present invention to provide a method for the extraction of selected toxic and/or valuable metal ions from aqueous solutions with a polymeric extractant. It is another object to provide a method for the selective extraction of metal ions employing a polymeric extractant which is easily synthesized and which is resistant to degration through continued use. These and other objects and advantages will become apparent in the following description and examples.

The present invention is a method for the extraction of certain metal ions from an aqueous solution by contacting the solution with a polymeric extractant having primary phosphinic acid and/or secondary phosphine oxide functional groups. In a method according to the present invention, the polymeric extractant extracts the metal ion both by ion exchange and by reducing some of the metal ions to the elemental state to remove the metal from solution.

The method may be used to extract any metal ion or metal ion complex having a reduction potential for reduction to the elemental state of greater than about +0.3. For example, the method may be employed to selectively extract mercury, silver and gold ions from solution.

Extraction is accomplished by contacting the solution containing the metal ions with a polymeric extractant having either primary phosphinic acid groups or secondary phosphinic oxide groups or both functional groups. Preferably, the method is performed by passing the solution though a column containing the extractants in bead form. Alternately, extraction may be performed by placing the beads in contact with the solution in a container followed by physical separation of the beads from the solution. The functional groups on the extractants perform the dual role of selective ion exchange and performing redox functions. It is believed that the following formula reflects the reactions which occur during extraction:

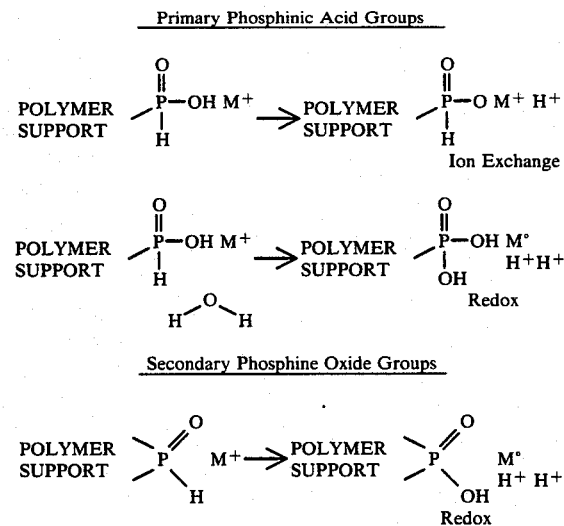

The polymeric support for the extractant employed in the method is an polymer support which is capable of covalently bonding with the primary phosphinic acid groups and/or secondary (bridged) phosphine oxide groups. The polymer support should have mechanical stability for use in an extraction column and chemical stability to strong acids and bases. A suitable polymer support is provided by polystyrene with divinylbenzene cross-linking. Preferably, the extractant is provided in the form of beads, having an average diameter of about 0.5 mm, with between about 2 and about 15% by weight divinylbenzene benzene to provide the desired mechanical stability. Beads of the extractant may be provided in either gel form or macroporous form, i.e. having pores with an average size above 50 Å.

The method of the present invention results in the collection of the metal ions and elemental metal on the extractant resin. When macroporous beads are used with some metals ions, e.g., mercury, much of the elemental mercury falls off the extractant resins and may be physically separated from the beads. With most metals and whenever gel beads are used, the metal is coated on the beads and extracted metal may be stripped from the beads by eluting with a strong oxidizing acid e.g., 4N $HNO_3$. The resin is regenerated for reuse with a water stable reducing agent such as sodium borohydride. As an alternative to striping the metal from the extractant, the extractant is destroyed by combustion to leave a residue containing the extracted metal.

An extractant for use in the method of the present invention is represented by the following formula:

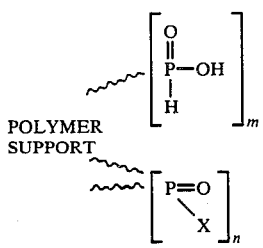

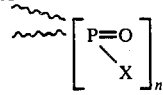

wherein X is H or OH and m and n are each greater than 1. Extractants for use in the method of the present invention may be prepared by the functionalizaiton of an aromatic polymer by reaction with phosphorous trichloride in the presence of a Friedel-Crafts catalyst followed by hydrolysis. The overall reaction may be summarized generally:

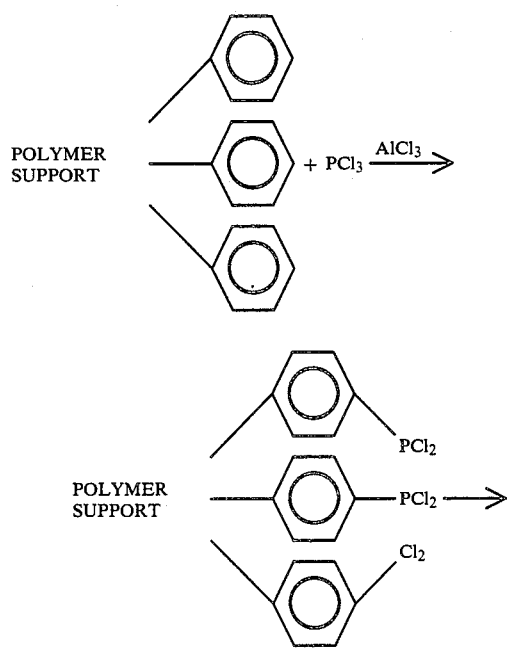

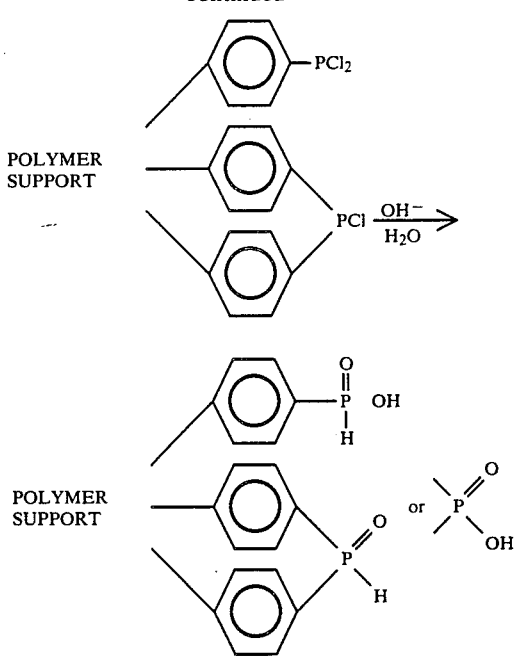

It will be understood that the foregoing representation of an aromatic polymer which shows phenyl groups is intended to include other aromatic polymers having other aryl groups, with or without substituents, capable of the reaction as shown, e.g. polyvinyl naphthalene. Because of its commercial availablity, polystyrene with divinylbenzene cross-linking for mechanical stability is a suitable aromatic polymer starting material.

As shown in the outline above, hydrolysis with 1N NaOH yields bifunctional extractants having primary (monoaryl) and secondary (bridged diaryl) phosphinic acid groups. If water is used to perform the hydrolysis, the result is a bifunctional extractant having primary (monoaryl) phosphinic acid groups and secondary (bridged diaryl) phosphine oxide groups. An extractant with phosphine oxide groups may be converted to an extractant with secondary phosphinic acid groups by reaction with a strong base, e.g., 1N NaOH. For most applications, an extractant having secondary (bridged diaryl) phosphine oxide groups is preferably prepared because if has greater redox capabilities than the corresponding resin with secondary phosphine oxide groups.

When polystyrene with divinylbenzene cross-linking is the chosen polymeric support the starting material may be provided in macroporous or gel beads. The amount of divinylbenzene cross-linking preferably is in the range of between about 2 and about 15% by weight. When the cross-linking level is above 8%, the beads should be macroporous to permit sufficient reagent accessibility and a greater extent of functionalization. The void volume of the macroporous beads should range between 10% by volume and about 60% by volume.

It has been found that the level of cross-linking linking affects the number of secondary groups produced in the polymer while the number of primary groups remain relatively constant. For macroporous beads, the ratio of secondary to primary groups falls by 40% as cross-linking increases form between about 2% to about 15% divinylbenzene by weight.

Moreover, to produce secondary phosphinic acid groups it has been found that the temperature for the reaction of phosphorous trichloride with the polymer must be maintained at least above 40° C. and preferably in the range of between about 60° and about 80° C. In addition, it has been found that the number of secondary groups increases as the amount of $AlCl_3$ catalyst increases. In order to produce substantial numbers of secondary sites, the aluminum chloride must be at least about 0.5 moles $AlCl_3$ per mole of polymer and preferably should be in the range of between about 0.77 and about 1.2 moles $AlCl_3$ per mole of polymer.

The extractants synthesized as described above may be analyzed to determine their quantity of respective functional groups per gram of extractant. It is convenient to express these qualities as milliequivalents per gram of extractant (meq/g). Since both the primary and secondary phosphinic acids are monoprotic, the extractants may be conditioned to the acid form and titrated with a strong base to determine the total acid equivalency. When phosphine oxide groups are present, the total acid capacity equals the number of primary phosphinic acid groups. The meq/g of phosphine oxide and primary phosphinic acid groups may be determined by $I_2$ oxidation and back titration of the remaining $I_2$ sodium thiosulfate. In addition, the total phosphorous content which is an accurate indicator of total functionalization, may be determined on beads of the extractant solubilized with perchloric acid.

Table I shows the milliequivalents per gram of extractant (meq/g) of primary and secondary phosphinic acid groups with various divinylbenzene (DVB) cross-linking levels for macroporous resins ($AlCl_3$ catalyst at a level of 0.77 mole per mole of resin and temperature of 73° C.):

TABLE I

| % DVB | Primary Acid Groups (meq/g) | Secondary Acid Groups (meq/g) | Total (meq/g) |
| --- | --- | --- | --- |
| 2% DVB | 2.31 | 2.10 | 4.41 |
| 5% DVB | 2.54 | 1.59 | 4.13 |
| 10% DVB | 2.45 | 1.50 | 3.95 |
| 15% DVB | 2.48 | 1.42 | 3.90 |

Some illustrative examples of the method of the present invention are provided below:

EXAMPLE I

The following procedure is used to synthesize an extractant having primary and secondary phosphinic acid groups on a 2% divinylbenzene-cross-linked polystyrene support in gel bead form:

To prepare the polystyrene support in gel bead form, 0.96 g gelatin, 11.90 g polydiallyldimethylammonium chloride, and 6.33 g boric acid are dissolved in 316.5 ml of water. The pH is adjusted to 10.3 with 50% sodium hydroxide. This mixture, which may be referred to as the aqueous phase, is placed in a one liter round bottom flask eqipped with a condenser, dry nitrogen purge, thermometer with an appropriate monitor, and a stirrer with a double-paddle stir shaft having a paddle diameter of 8 cm. 286.7 g styrene, 10.3 g divinylbenzene and 3.99 g benzoyl peroxide are mixed to form a monomer mix. The monomer mix is then added to the aqueous phase. The stir speed is set at 250 rpm and the contents of the flask are heated over a two-hour period to 80° C. and the temperature is maintained for 10 hours to produce the polystyrene support. Complete polymerization is ensured by further heating of the contents at 100° C. for 2 hours. Gel beads of the polystyrene support having 2% divinylbenzene cross-linking result from these procedures.

To functionalize the polystyrene support, 10 g of the 2% polystyrene beads (0.10 mole) are placed with 130 ml of phosphorous trichloride in a 250 ml round bottom flask equipped with a stirrer, condenser and thermometer. Polymer beads are allowed to swell with phosphorous trichloride for 1 hour. 10.27 g of AlCl catalyst (0.077 mole) is added and the mixture is heated over a 1 hour period to 73° C. and the temperature is held constant for 4 hours. The beads are then hydrolyzed with 550 ml of water saturated with sodium chloride at 0° C. to produce an extractant with primary phosphinic acid groups and secondary phosphine oxide groups. The extractant is washed with water until neutral and is placed in a glass frit funnel. The extractant is further washed sequentially with the following: 1 liter 1N HCl, 1 liter water, each washing requiring one hour.

The extractant contains 2.40 meq/g primary phosphininc acid groups and 2.23 meq/g secondary phosphine oxide groups. Total acid equivalency was 2.40 meq/g.

The extractant as prepared by the procedure above is used as follows:

Seven vials are filled with 5 ml solutions of $Hg^{2+}$ to result in the $R_i$ values as stated the following table with the samples of the resin containing 1 meq of total acid equivalency. $R_i$ is the ratio of the initial quantity of metal ion being extracted in milliequivalents to the total equivalents of total acid capacity in the resin. The $Hg^{2+}$ is added to the 5 ml solutions containing 4N $NaNO_3$ so that each vial contains approximately 4N nitrate ion. A constant ionic strength background is thus maintained. The extraction was continued for 17 h. Table II shows the results.

TABLE II

| RESIN | 2% DVB GEL BEADS | | | | | | |
| --- | --- | --- | --- | --- | --- | --- | --- |
| $R_i$ | .10 | .30 | .50 | .70 | 1.0 | 1.3 | 1.5 |
| % Hg Absorbed | 98. | 98. | 98. | 97. | 85. | 71. | 61. |

EXAMPLE II

The resin as in Example I was oxidized with 1N MaOH to produce a resin with primary and secondary phosphinic acid groups. Ten samples containing $Hg^{+2}$ and $Zn^{+2}$ and appropriate quantities of this resin to result in the $R_i$ values shown in Table III are prepared. $Na^+$ at a concentration of 2N was included in each sample. Table III shows the results.

TABLE III

| | 2% DVB Gel Beads | | | | | | | | | |
| --- | --- | --- | --- | --- | --- | --- | --- | --- | --- | --- |
| $R_i (Zn^{+2})$ | .5 | .5 | .5 | .5 | .5 | 1 | 1 | 1 | 1 | 1 |
| $R_i (Hg^{+2})$ | .1 | .3 | .5 | .7 | 1.0 | .1 | .3 | .5 | .7 | 1 |
| % Hg Absorbed | 95.34 | 87.23 | 80.32 | 75.78 | 75.28 | 92.20 | 84.18 | 77.04 | 70.30 | 63.85 |

EXAMPLE III

Seven samples of $Au^{+3}$ and appropriate quantities of resin as used in Example II is employed to result in the R values shown in Table IV. $2N\ Na^+$ is present in each sample. Table IV shows the results.

TABLE IV

| | 2% DVB Beads | | | | | | |
|---|---|---|---|---|---|---|---|
| $R_i$ | $1.6 \times 10^{-4}$ | .001 | .01 | .02 | .03 | .06 | .1 |
| % $Au^{+3}$ Absorbed | 95.73 | 94.82 | 97.59 | 97.62 | 96.87 | 92.26 | 91.52 |

The method of the present invention effectively extracts metal ions having a reduction potential above about +0.3 from aqueous solutions. At $R_i$ values of up to approximately 0.5 the extraction is almost quantitative. The extraction is not affected by alkali metal ions being present in the solution. Moreover, the extraction of metals having a reduction potential of above about +0.3 is not appreciably affected by the presence of other metal ions, e.g., transition metal ions having a lower reduction potential in the solution. The method is further operable to extract trace quantities of metal ions having a reduction potential of above about +0.3, again almost quantitatively.

The present invention is an efficient extraction method for various toxic metal ions and is useful for treatment of wastewater containing, for example, mercury ions. In addition, the method is effective for recovering valuable metals for example silver and gold from solutions which are used in various process. The invention is potentially useful of the extraction of gold and other metals from seawater. The metals collected are easily stripped from the extractant. All of the above advantages may be achieved while employing polymeric extractants which are inexpensive to manufacture and will withstand continuous use.

While various embodiments of the present invention have been shown and described, it will be understood that there is no intent to limit the invention by such disclosure, but rather it is intended to cover all modifications and alternate embodiments falling within the spirit and scope of the invention as defined in the appended claims.

What is claimed:

1. A method for extracting metal ions having a standard reduction potential of greater than about +0.3 from an aqueous solution comprising contacting the solution with a polymeric composition comprising a polymer support capable of covalently bonding to substituents, said polymeric composition further comprising substituents covalently bonded to said polymer support selected from the class consisting of primary phosphinic acid groups and secondary phosphine oxide groups.

2. The method of claim 1 further comprising stripping the extracted metal ions from the polymeric composition by eluting with an oxidizing acid.

3. A method for extracting metal ions having a standard reduction potential of greater than about +0.3 from an aqueous solution comprising contacting the solution with a polymeric composition comprising a polymer support, a major portion of which is a polymerized monovinyl aromatic hydrocarbon providing aromatic nuclei capable of covalently bonding to substituents, said composition further comprising substituents selected from the class consisting of primary phosphinic acid groups bonded covalently to one of said nuclei and secondary phoshine oxide groups bridging between and being covalently bonded to a pair of said nuclei.

4. The method of claim 3 further comprising stripping the extracted metal ions from the polymeric composition by eluting with an oxidizing acid.

* * * * *

UNITED STATES PATENT AND TRADEMARK OFFICE
CERTIFICATE OF CORRECTION

PATENT NO. : 4,664,700
DATED : May 12, 1987
INVENTOR(S) : Spiro D. Alexandratos

It is certified that error appears in the above-identified patent and that said Letters Patent is hereby corrected as shown below:

IN THE SPECIFICATION:

The following should appear as the first paragraph of Column 1:

-- The United States Government has rights in this invention pursuant to Department of Energy, Office of Basic Energy Sciences, Contract No. DE-AS05-83ER13113. --

Signed and Sealed this

Thirteenth Day of October, 1987

Attest:

DONALD J. QUIGG

*Attesting Officer*  *Commissioner of Patents and Trademarks*